US006076956A

United States Patent [19]
Scheucher et al.

[11] Patent Number: 6,076,956
[45] Date of Patent: Jun. 20, 2000

[54] DEVICE FOR DISTRIBUTING SUSPENSIONS IN A CONTAINER

[75] Inventors: Peter Scheucher, Kumberg; Gerald Schnur, Graz; Gerhard Sommer, Waltersdorf, all of Austria

[73] Assignee: Andritz-Patentverwaltungs-Gesselschaft m.b.H., Graz, Austria

[21] Appl. No.: 09/029,501

[22] PCT Filed: Jun. 9, 1997

[86] PCT No.: PCT/EP97/02996

§ 371 Date: Feb. 26, 1998

§ 102(e) Date: Feb. 26, 1998

[87] PCT Pub. No.: WO97/49860

PCT Pub. Date: Dec. 31, 1997

[30] Foreign Application Priority Data

Jun. 26, 1996 [AT] Austria ................................. A 1127/96

[51] Int. Cl.[7] .............................. B01F 5/06; D21C 7/06
[52] U.S. Cl. .................................... 366/171.1; 366/174.1; 366/244; 162/246; 137/565.1
[58] Field of Search ..................... 162/52, 246; 137/565, 137/656.1; 322/185.1, 424.5; 366/171.1, 172.2, 174.1, 241, 244, 341

[56] References Cited

U.S. PATENT DOCUMENTS

| 148,125 | 3/1874 | Lahousse | 162/246 |
|---|---|---|---|
| 3,206,356 | 9/1965 | Carlsmith | 162/237 |
| 3,992,248 | 11/1976 | Hurter | 162/17 |
| 4,093,506 | 6/1978 | Richter | 162/17 |
| 4,161,421 | 7/1979 | Sherman | 162/18 |
| 4,427,489 | 1/1984 | Jacobsen | 162/57 |
| 4,621,507 | 11/1986 | Lundqvist | 63/181 R |
| 5,397,434 | 3/1995 | Costa et al. | 162/4 |
| 5,500,083 | 3/1996 | Johanson | 162/17 |
| 5,711,600 | 1/1998 | Toukonummi | 366/171.1 |

Primary Examiner—Dean T. Nguyen
Attorney, Agent, or Firm—Alix, Yale & Ristas, LLP

[57] ABSTRACT

The invention refers to a device for distributing suspensions, particularly pulp suspensions, in a tank 1, particularly a bleaching tower. It is characterized by a disc 6 being provided near the base 3 of the tank with at least one opening 7 so that the suspension is fed to the tank 1 and distributed in cycles over the tank cross-section near its base 3.

23 Claims, 4 Drawing Sheets

DEVICE FOR DISTRIBUTING SUSPENSIONS IN A CONTAINER

CROSS REFERENCE TO RELATED APPLICATIONS

This is the national phase of International Application No. PCT/EP97/02996 filed Jun. 9, 1997.

BACKGROUND OF THE INVENTION

The invention refers to a device for distributing suspensions, particularly pulp suspensions, in a tank, particularly a bleach tower.

In order to prevent the pulp from caking on the walls of a tank, particularly a bleach tower, the suspension must be distributed over the cross-section. A device is known, for example, in which a rotating, horizontal tube is provided to distribute the suspension over the cross-section. This design has the considerable disadvantage that the horizontal tube has to be moved through the suspension in the tank, which demands very high drive power. A further design is known from U.S. Pat. No. 4,621,507, where the suspension is distributed by a rotating cylinder which has web plates or paddles in its inner chamber. The common denominator of the devices of the state of the art mentioned above is that practically the entire quantity of suspension is accelerated, which leads to high energy input, i.e. the distribution elements require high drive power.

SUMMARY OF THE INVENTION

The aim of the invention is thus to create a simple and energy-saving device for distributing the suspension when it is fed into a tank.

According to the invention, this is achieved by providing a disc near the base of the tank with at least one opening so that the suspension is fed to the tank and distributed in cycles over the tank cross-section near its base. Since the suspension is fed into the tank in cycles over the cross-section of the tank base, there is no need to accelerate the suspension, particularly in radial direction.

An advantageous further development of the invention is characterised by a stationary body, in particular a conical body, being provided in the area above the disc, where stationary web plates are provided between the stationary body and the wall of the tank, which form channels with the stationary body and the tank wall. With this arrangement it is particularly easy to divide the flow and distribute the pulp suspension over a larger circumference. This design prevents the pulp from being intermixed and due to the stationary body, particularly a conical body, it is also prevented from settling.

A favourable further development of the invention is characterised by a rotating device, for example paddle blades, being provided underneath the disc to help feed the suspension to the opening. This improves distribution of the suspension on the one hand, and on the other, it prevents the pulp from caking underneath the disc.

A particularly favourable configuration of the invention is characterised by the disc rotating, where a chamber which is connected to the suspension feed pipe can be provided underneath the rotating disc. With this configuration, the energy input for distribution is reduced to a minimum because only one disc has to be rotated and because the suspension is distributed in the tank in a simple way, for example from a distribution area located underneath the disc, and through the opening which is now rotating. If there are also a stationary body and web plates available which form channels, the suspension can be distributed in the tank in a favourable way and without high energy input.

An alternative configuration of the invention is characterised by the disc having several openings which are connected to an annular channel or a feed chamber for the suspension and which can be closed or opened by means of regulating elements, such as butterfly, slide or disk valves, where the regulating elements clear the openings in a particular sequence, especially in a continuous sequence in the sense of rotation. This configuration not only permits a continuous suspension feed in the sense of rotation, but practically any other feed sequence as well, thus providing even better distribution. Even if one of the actuating drives fails, adequate distribution of the suspension is still guaranteed.

An advantageous configuration of the invention is characterised by the base of the tank being formed with twin cones. This design, which is of special advantage when used with regulating elements, permits a particularly favourable tank arrangement without requiring additional built-in elements.

The invention is used primarily for feeding pulp suspensions in the medium-consistency range, i.e. between approximately 8 and 15% consistency, however it can also be used in ranges beyond this.

BRIEF DESCRIPTION OF THE FIGURES

In the following the invention will be described using examples shown in the drawings, where.

DETAILED DESCRIPTION OF THE INVENTION

Figure 1:
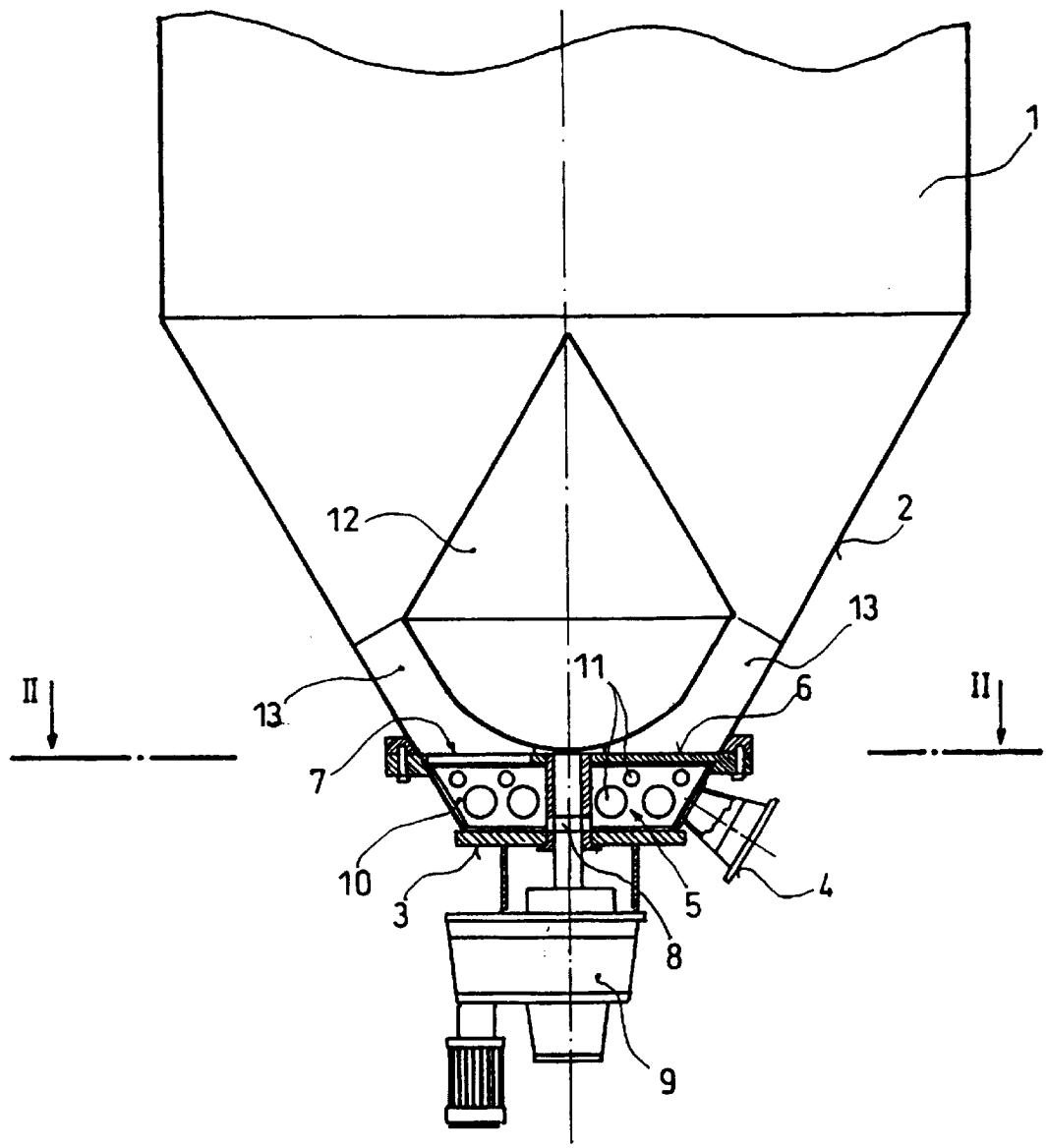
FIG. 1 shows one configuration of the invention.

FIG. 1 shows a bleach tower 1 in the pulp industry, with the walls 2 in the lower section converging in a truncated cone shape and a base 3. The pulp suspension, preferably in the medium consistency range between approximately 8 and 15%, is fed in through a pipe and a connection piece 4 into a feed chamber 5 which is located above the actual base of the tank 3. The feed chamber 5 is closed off from the inside of the bleach tower 1 with a disc 6. The disc 6 has an opening 7 and is connected to a drive 9 by a shaft 8. The shaft 8 is also secured to walls or scrapers 10 which have holes 11 in order to avoid setting the entire suspension in rotation.

Above the disc 6 there is a stationary, conical body 12, which is spherical on the underside. It can, however, take different shapes, e.g. a truncated cone. The bottom section of the stationary body 12 is connected by several web plates 13, which can be straight or curved, to the wall 2 of the tank, such that flow channels are formed between the wall 2 of the tank, the stationary body 12 and the web plates 13. The pulp suspension is now fed in through the connection piece 4 into the feed chamber 5. Due to the rotation of the disc 6, the opening 7 is moved in cycles past each point in the cross-section of the tank so that the suspension exits into the bottom section of the tank, spread evenly over the cross-section. It is then directed upwards through the flow channels formed by the web plates 13. Due to these web plates 13, the suspension is always forced to move upwards and thus, there is practically always an upward flow prevailing and caking on the walls 2 of the tank is avoided. This is further assisted by the fact that the suspension always flows through the opening 7 upwards and thus, is not braked by being deflected.

Figure 2:
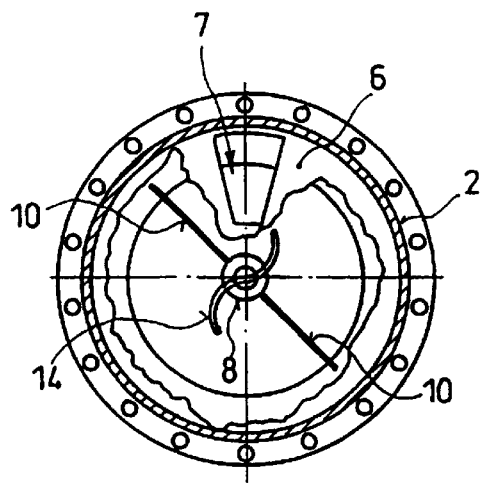
FIG. 2 illustrates a section through the line II—II in FIG. 1.

FIG. 2 illustrates a section through the line marked II—II in FIG. 1 and shows the rotating disc 6 with the opening 7 and the shaft 8. Here, the illustration also indicates the walls 10, which prevent caking in the feed chamber 5. Furthermore, as shown in FIG. 2, an additional web plate 14 can be provided to prevent caking in the gap between the disc 6 and the base of the stationary body 12.

Figure 3:
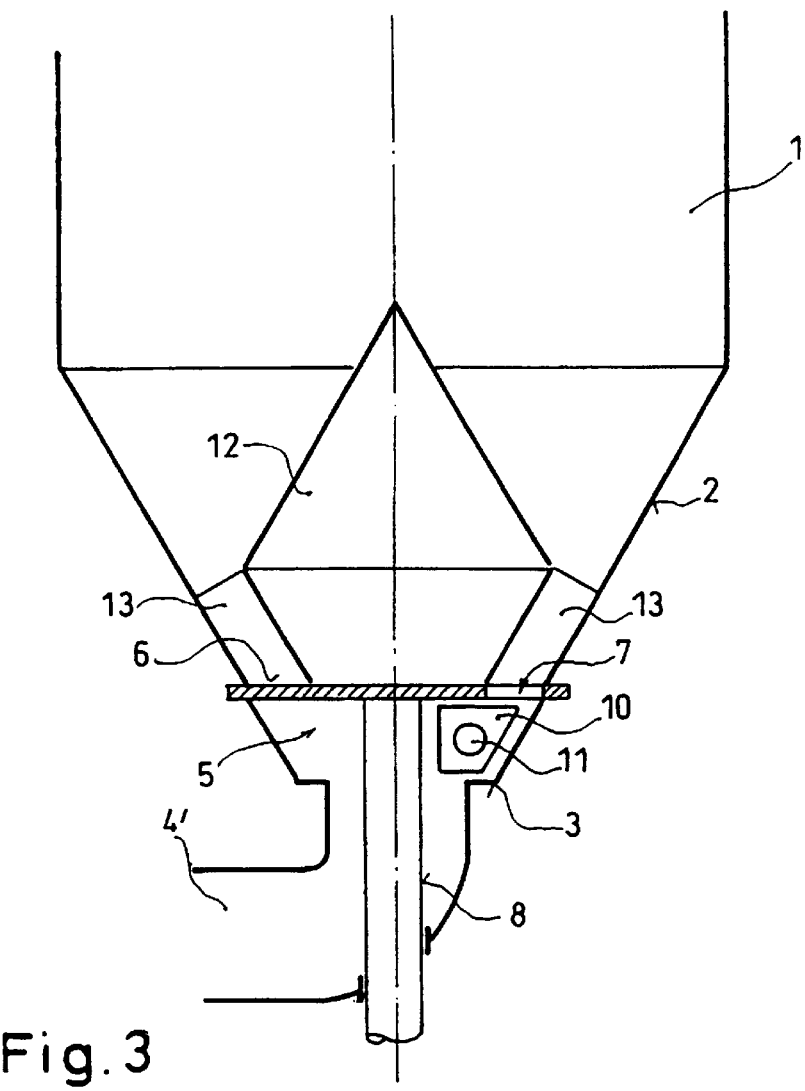
FIG. 3 shows a further configuration of the invention, FIG. 4 contains a variant of the invention with regulating elements.

FIG. 3 shows a variant of the invention which is similar to the variant illustrated in FIG. 1. The difference here is that the pipe 4 in the shape of a quarter bend is mounted on the base 3 of the tank from below. This is a particular advantage with large quantities of suspension. In addition, the scraper 10 only covers a small area of the feed chamber 5 and the bottom section of the stationary body 12 has the shape of a truncated cone. The suspension is fed in here through a circular ring cross-section into the bleach tower 1.

Figure 4:
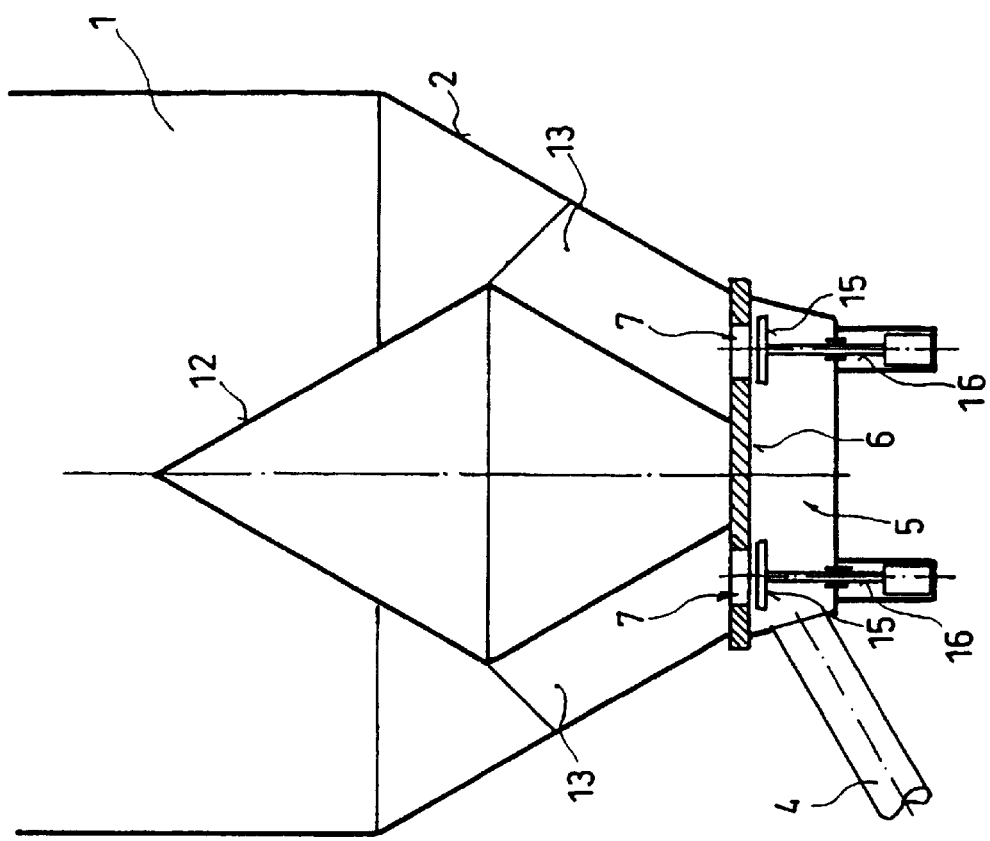

FIG. 4 shows a further variant of the invention, where the disc 6 is stationary and has several openings 7. The openings 7 are closed here by disk valves 15 which are adjusted by cylinders 16. Pneumatic cylinders, hydraulic cylinders or servomotors can be used to drive the disc valves 15. The regulating elements here can be controlled such that the valves open one after the other in the direction of rotation. If necessary, the regulating elements can also be controlled in any particular sequence, not necessarily in the order in which they are arranged. As an alternative to lateral feed through the connection piece 4, the suspension can also be fed in through a pipe bend 4' mounted axially.

Figure 5:
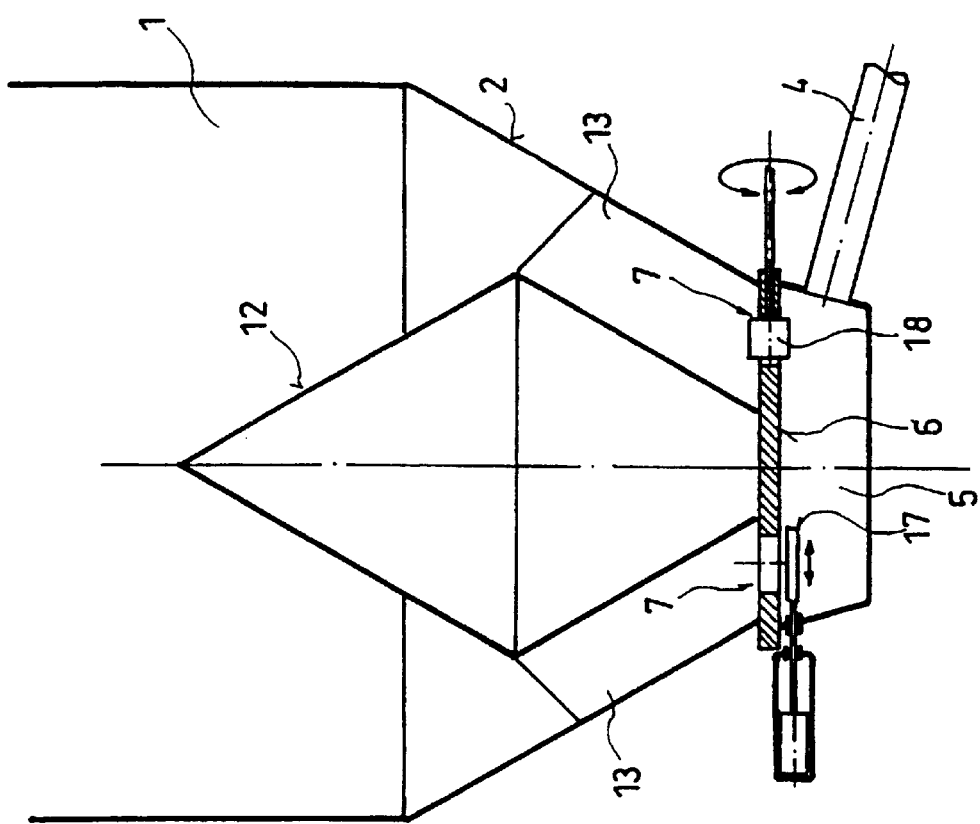
FIG. 5 shows a further variant of the invention with regulating elements and FIG. 6 contains a variant of the invention with twin cones forming the base of the tank.

The openings 7 can also be opened and closed by slide 17 or butterfly valves 18, as shown in FIG. 5, with a slide valve 17 on the left and a butterfly valve 18 on the right.

Figure 6:
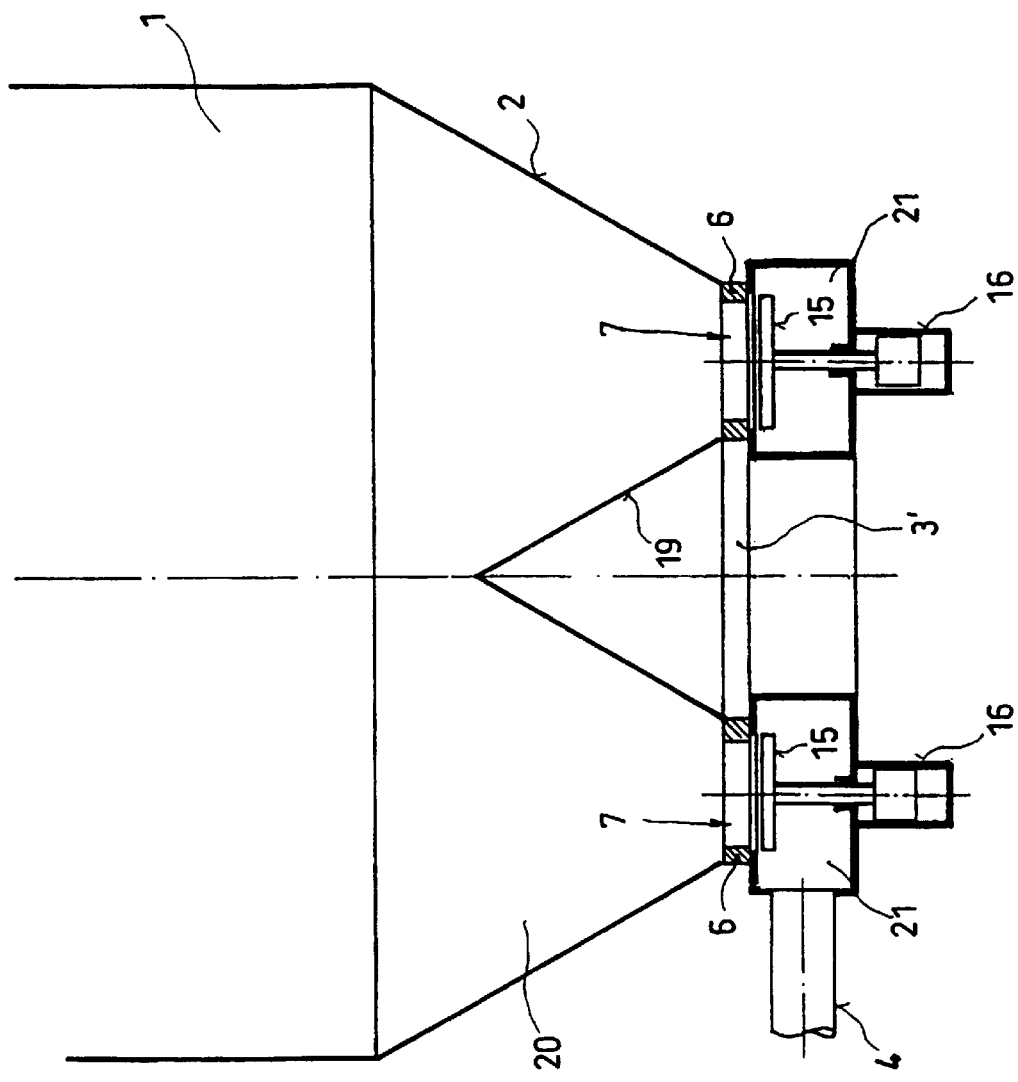

FIG. 6 shows a variant of the invention where a bleach tower 1 has a twin-cone base section. At the tank wall 2 which converges in a truncated cone shape, a cone 19 is mounted coaxially and oppositely oriented to form twin overlapping cones so that a ring 20 forms. The annular disc 6 surrounds the cone 19 and constitutes a ring shaped base plate 3'. The suspension is fed in through the connection piece 4 into an annular channel 21. The openings 7 in the circular ring base 3' are closed in cycles using, for example, disk valves 15.

The number of revolutions by the rotating disc is approximately 1 to 10 r.p.m., which means a cycle of 1 to 10 times per minute for the other variants.

What is claimed is:

1. In a suspension treatment device for distributing pulp suspensions near a base end of an upright tank for treating pulp during upward movement therethrough, wherein the improvement comprises:

a disc located near the base end on a cross-section of the tank, with at least one opening in the disc for distributing the suspension in cycles over said tank cross-section;

a feed chamber located below the disc, said chamber being fluidly connected to a suspension feed pipe;

wherein the disc has a plurality of openings which are fluidly connected to the feed chamber; and regulating means for selectively clearing and closing each opening.

2. The suspension treatment device according to claim 1, wherein the feed chamber is an annular channel.

3. A suspension treatment device according to claim 1, wherein the regulating means clears at least one opening while closing at least one others opening.

4. A suspension treatment device according to claim 3, wherein the regulating means clears the openings consecutively around the disc.

5. A suspension treatment device according to claim 1, wherein the base of the tank is formed as coaxial, oppositely oriented twin cones and said disc is an annular disc situated between the twin cones to form an end plate of the base.

6. A suspension treatment device in a tank having a base for receiving said suspension from a feed chamber, comprising:

a tank having a base, a feed changer fluidly connected to the base of the tank, and a rotating disc near the base of the tank, sealing off said feed chamber from said tank, said disc including at least one opening arranged eccentric in said disc for distributing the suspension to said tank cyclically over the tank cross-section near the base of said tank.

7. A suspension treatment device according to claim 6, wherein said tank is a bleach tower.

8. A suspension treatment device according to claim 6, comprising a stationary body in the tank above said disc.

9. A suspension treatment device according to claim 8, wherein said stationary body is a conical body.

10. A suspension treatment device according to claim 8, comprising web plates between said stationary body and the wall of said tank, which form channels with said stationary body and said tank wall.

11. A suspension treatment device according to claim 6, comprising an additional rotating device underneath said disc to help feed the suspension to the opening of said disc.

12. A suspension treatment device according to claim 11, wherein said rotating device are paddle blades.

13. A suspension treatment device in a tank having a base comprising a tank having a base, an annular channel or feed chamber and a disc near the base of the tank, said disc sealing off said annular feed chamber from said tank, said disc including several openings connected to regulating elements arranged for distributing the suspension to said tank cyclic over the tank cross-section near the base of said tank.

14. A suspension treatment device according to claim 13, wherein said regulating elements are butterfly valves, slide valves or disc valves.

15. A suspension treatment device according to claim 13, wherein the base of the tank is formed with twin cones.

16. In a suspension treatment device comprising a device for distributing pulp suspensions near a base end of an upright tank, wherein the improvement comprises:

a feed chamber located near said base end and a rotating disc located near said base end on a cross-section of said tank, said disc sealing off the feed chamber from said tank, said disc including at least one opening arranged eccentric in said disc for distributing the suspension to said tank cyclic over said tank cross-section.

17. A suspension treatment device according to claim 16, wherein a stationary substantially conical body is located in said tank immediately above the disc.

18. A suspension treatment device according to claim 17, wherein said tank is defined by a tank wall and stationary web plates are provided between said stationary body and said tank wall, which with said stationary body, form generally upwardly extending channels.

19. A suspension treatment device according to claim 16, wherein said base end is closed by a base plate, said disc is located above said base plate, said feed chamber is defined in said tank between said base plate and said routable disc, and said feed chamber is fluidly connected to said opening and to a suspension feed pipe.

20. In a suspension treatment device comprising a device for distributing pulp suspensions near a base end of an upright tank, wherein the improvement comprises:

a disc located near said base end on a cross-section of said tank sealing off a feed chamber from said tank, wherein said feed chamber is an annular channel and said disc includes a plurality of openings connected to regulating means for distributing the suspension to said tank cyclic over said tank cross-section.

21. A suspension treatment device according to claim 20, wherein said regulating means clears at least one opening while closing at least one other opening.

22. A suspension treatment device according to claim 21, wherein said regulating means clears said openings consecutively around said disc.

23. A suspension treatment device according to claim 20, wherein said base of said tank is formed as coaxial, oppositely oriented twin cones and said disc is an annular disc situated between said twin cones to form an end plate of said base.

* * * * *